United States Patent
Egle

(10) Patent No.: US 10,120,935 B2
(45) Date of Patent: Nov. 6, 2018

(54) METHOD FOR OPERATING AN INFOTAINMENT SYSTEM

(71) Applicant: AUDI AG, Ingolstadt (DE)

(72) Inventor: Frank Egle, Koesching (DE)

(73) Assignee: AUDI AG, Ingolstadt (DE)

( * ) Notice: Subject to any disclaimer, the term of this patent is extended or adjusted under 35 U.S.C. 154(b) by 305 days.

(21) Appl. No.: 14/760,586

(22) PCT Filed: Nov. 22, 2013

(86) PCT No.: PCT/EP2013/003529
§ 371 (c)(1),
(2) Date: Jul. 13, 2015

(87) PCT Pub. No.: WO2014/108151
PCT Pub. Date: Jul. 17, 2014

(65) Prior Publication Data
US 2015/0356177 A1 Dec. 10, 2015

(30) Foreign Application Priority Data
Jan. 11, 2013 (DE) ......................... 10 2013 000 369

(51) Int. Cl.
*G06F 17/30* (2006.01)
*G06F 7/00* (2006.01)
(Continued)

(52) U.S. Cl.
CPC .... *G06F 17/30769* (2013.01); *G06F 17/3074* (2013.01); *G06F 17/30743* (2013.01); *G11B 27/105* (2013.01); *G11B 27/34* (2013.01)

(58) Field of Classification Search
CPC ......... G06F 17/30743; G06F 17/30752; G06F 17/30766; G06F 17/30769
See application file for complete search history.

(56) References Cited

U.S. PATENT DOCUMENTS 6,928,433 B2 * 8/2005 Goodman ............. G06F 3/0482
  386/243
6,961,731 B2 * 11/2005 Holbrook .......... G06F 17/30696
  707/102
(Continued)

FOREIGN PATENT DOCUMENTS

CN   1845104      10/2006
DE   102009059868  6/2011
(Continued)

OTHER PUBLICATIONS

German Office Action for German Priority Patent Application No. 10 2013 000 369.5, dated Sep. 30, 2013, 8 pages.
(Continued)

*Primary Examiner* — Marc S Somers
(74) *Attorney, Agent, or Firm* — Staas & Halsey LLP

(57) ABSTRACT

A method operates an infotainment system in order to provide an overview of audio data records detected by a music output device. An evaluation device arranges the detected audio data records into an audio data record group according to a selection criterion, e.g. the artist. The evaluation device determines a value of a predetermined user-relevant evaluation variable for each audio data record. On the basis of the respective values, the evaluation device then determines a ranking list of the audio data records in each audio data record group. The evaluation device generates a digital image for each audio data record and assigns the images of those audio data records that are combined into an audio data record group to an image group. The position of the images in an image group depends on the position of the respective associated audio data record in the ranking list.

20 Claims, 2 Drawing Sheets

(51) Int. Cl.
   *G11B 27/34* (2006.01)
   *G11B 27/10* (2006.01)

(56) References Cited

U.S. PATENT DOCUMENTS

| | | | |
|---|---|---|---|
| 8,836,658 B1* | 9/2014 | Jia | G06F 3/04815 345/173 |
| 2005/0225402 A1 | 10/2005 | Abraham et al. | |
| 2005/0278656 A1* | 12/2005 | Goldthwaite | G06F 17/30775 715/810 |
| 2006/0071918 A1 | 4/2006 | Mori et al. | |
| 2006/0242098 A1* | 10/2006 | Wnek | G06F 17/30634 706/45 |
| 2007/0162298 A1* | 7/2007 | Melton | G06F 17/30864 715/234 |
| 2007/0204227 A1 | 8/2007 | Kretz | |
| 2008/0005688 A1 | 1/2008 | Najdenovski | |
| 2009/0164928 A1* | 6/2009 | Brown | G06F 3/0482 715/767 |
| 2010/0198767 A1* | 8/2010 | Farrelly | G06F 17/30053 706/46 |
| 2010/0229124 A1 | 9/2010 | Green | |
| 2011/0035031 A1* | 2/2011 | Faenger | G06Q 30/00 700/94 |
| 2011/0113384 A1* | 5/2011 | Gotcher | G06F 3/0482 715/851 |
| 2011/0283236 A1 | 11/2011 | Beaumier et al. | |
| 2012/0062550 A1 | 3/2012 | Yoshioka | |
| 2013/0185642 A1* | 7/2013 | Gammons | G06F 3/0482 715/733 |
| 2014/0331180 A1* | 11/2014 | Ju | G06F 3/04815 715/815 |

FOREIGN PATENT DOCUMENTS

| | | |
|---|---|---|
| DE | 10 2013 000 369.5 | 1/2013 |
| JP | 2004-292921 | 10/2004 |
| JP | 2005-302012 | 10/2005 |
| JP | 2006-107135 | 4/2006 |
| JP | 2007-109169 | 4/2007 |
| JP | 2007-179400 | 7/2007 |
| WO | 2011/145835 | 11/2011 |
| WO | PCT/EP2013/003529 | 11/2013 |

OTHER PUBLICATIONS

English language International Search Report for PCT/EP2013/003529, dated Oct. 17, 2014, 3 pages.
WIPO English language translation of the International Preliminary Report on Patentability for PCT/EP2013/003529, downloaded from WIPO website Jul. 13, 2015, 8 pages.
Chinese Office Action dated Nov. 18, 2016 in corresponding Chinese Patent Application No. 201380070143.3 with English language translation of summary of Examiner's comments, 10 pp.
Knees et al., "Exploring Music Collections in Virtual Landscapes", IEEE Multimedia, IEEE Service Center, vol. 14, Issue 3, Jul. 1, 2007, pp. 46-54.

* cited by examiner

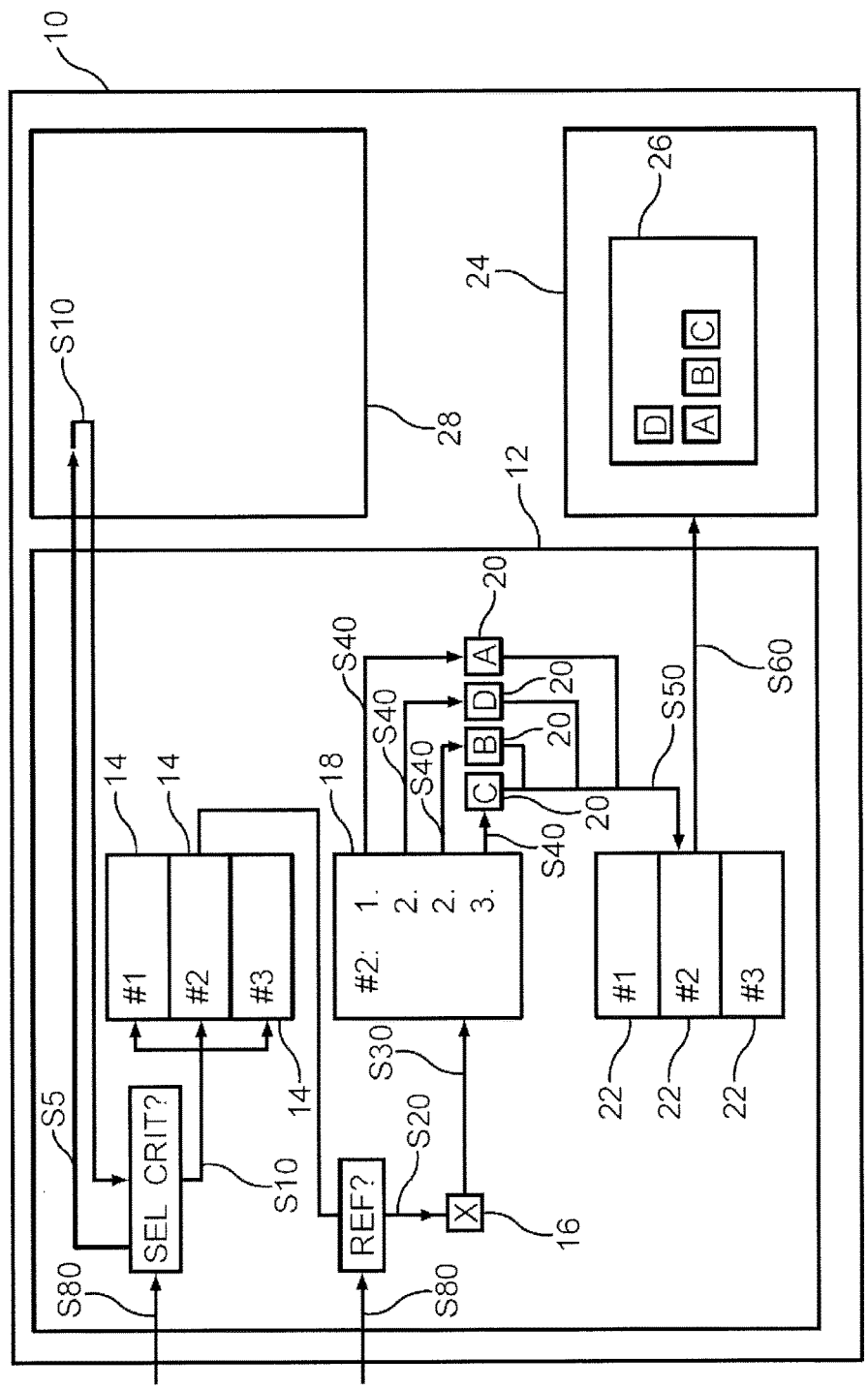

METHOD FOR OPERATING AN INFOTAINMENT SYSTEM

CROSS REFERENCE TO RELATED APPLICATIONS

This application is based on and hereby claims priority to International Application No. PCT/EP2013/003529 filed on Nov. 22, 2013 and German Application No. 10 2013 000 369.5 filed on Jan. 11, 2013, the contents of which are hereby incorporated by reference.

BACKGROUND

The invention relates to a method for operating an infotainment system for providing an overview of a plurality of audio data sets (digital audio records) acquired by a music output device, which audio data sets were therefore, at least once, stored, buffer-stored and output by the music output device or were downloaded from an external data server. In this case, the acquired audio data sets are grouped in accordance with a selection criterion.

Modern infotainment systems of motor vehicles offer a user of a motor vehicle diverse functions in the area of entertainment. User-friendly operability is always of interest here since the user, when operating such devices, should if possible not be distracted too much from the driving situation. Particularly in the case of functions, such as music reproduction, in which large volumes of data are managed and accessible by the user, assistance of the user is therefore particularly expedient.

JP 2005 302 012 A, published as JP 2007 109 169, describes a so-called music map, that is to say an overview of music files, with a symbol for music information stored in a music file in each case being represented thereon.

JP 2004 292 921 A, published as JP 2006 107 135, discloses a music reproduction device which can be used to search for music files in a simplified manner. The device makes it possible for symbols that represent a music file to be imaged on a two-dimensional map.

WO 2011/145835 A2 likewise describes a system for generating and displaying a music map. Various items of information concerning music files currently being listened to by a specific group of people can be displayed on a map according to interpreter, song or a regional hit parade.

The services known in the related art do not relate to the requirements of an automobile driver searching for a specific type of music that fulfills specific criteria e.g. during a journey.

SUMMARY

One possible object is to simplify the search for an audio data set for a motor vehicle driver.

The inventor proposes a method for providing an overview of a plurality of audio data sets on a display area of a display device of a motor vehicle, which audio data sets have already been acquired by a music output device, e.g. by a player of an infotainment system or by a network of players.

The overview is provided by a rating device, that is to say by a device, a device component or a computer program which is designed for data processing. The rating device classifies the acquired audio data sets into one of a plurality of audio data set groups in accordance with a selection criterion, that is to say sorts the acquired audio data sets e.g. according to the interpreter. The rating device then determines a value of a predetermined rating variable with respect to each acquired audio data set and rates it therewith.

The rating variable indicates a relevance of the audio data set to the user, that is to say e.g. the number of processes of outputting the acquired audio data set that have already been carried out via the music output device. The rating device determines within each audio data set group a ranking list of the rated audio data sets classified therein on the basis of the respective values for the rating variable. A music file that has been listened to e.g. very frequently by a user is therefore at a higher position on the ranking list than a music file that is listened to only rarely. As a result, the audio data sets are subjectively rated and the ranking list represents the preferences of the user.

The rating device generates with respect to each audio data set a digital image representing the respective audio data set. This can be e.g. an image of the associated album cover or interpreter or e.g. a colored square.

The rating device then classifies each digital image into an image group in a manner dependent on the association of the associated audio data set with a audio data set group. In other words, within an image group those images are then combined whose associated audio data sets are likewise combined in an audio data set group, and the digital images are thus grouped according to the same selection criterion.

For providing the overview of the audio data sets, the rating device then arranges the images in groups corresponding to the image groups. The position of the images within an image group is determined in a manner dependent on the position of the respective associated audio data set in the ranking list.

The resultant graphic can be displayed on a display area by the rating device transmitting e.g. the graphic to a corresponding device component, e.g. a screen of the infotainment system, for display. The graphic serves as an overview of the acquired audio data sets, on the basis of which the user rapidly finds his/her preferred music title and the user's attention need not be diverted from the driving situation for long since laborious searching in e.g. an alphabetic sorting is obviated.

In this case, an audio data set can comprise either one or a plurality of audio files, that is to say e.g. music files or voice recordings. If an audio data set comprises a plurality of audio files, then the latter may have been combined by the rating device in accordance with a further selection criterion. The rating device then generates an individual digital image for a plurality of audio files that are e.g. by the same interpreter (performer/recording artist). If the first selection criterion is e.g. a music genre, then it is possible to generate a digital image for an audio data set comprising all those audio files that are e.g. by a specific interpreter of this genre. Such insertion of subgroups enables even more audio files to be represented more clearly.

In the proposed method, the audio data sets can be grouped and/or rated according to different selection criteria and rating variable. The selection criterion can be e.g. an interpreter, an album, a music genre and/or a period of time, e.g. a decade or a year of publication. The rating variable can e.g. indicate how often an audio data set has already been output, stored and buffer-stored via the music output device and/or downloaded from a vehicle-external data server, and/or how many audio data sets of the same interpreter have been acquired by the music output device. The rating variable can also comprise a digitally acquired rating of the audio data set by the user. Such a rating can be issued by a user e.g. by virtue of the fact that said user, via a corresponding function provided e.g. by the music output device, can award a specific number of "stars" e.g. to an audio data set and can store this rating.

In this case, the selection criterion and/or the rating variable can be selected by the user by an operating action, e.g. by the operation of a rotary/pushbutton controller. In this case, the rating device receives a selection signal thus generated for selecting the selection criterion and/or the rating variable.

In one preferred embodiment, the rating device determines a position within the image group for a first image of an audio data set having the highest position in the ranking list. The distance between the further images and the first image is dependent on the position of the respective audio data set in the ranking list. In this case, the rating device can use an algorithm that determines the appearance of an arrangement of images e.g. by a random variable. The rating device can use an algorithm that sets the first image into the center of the image group and positions the further images e.g. helically around the first image in accordance with the ranking list of the audio data sets. Such an arrangement clearly visualizes the relevance of the acquired audio data sets and prevents the driver from being distracted from the driving situation.

The rating device can also generate an image having a predetermined marking, in particular a color or brightness, in a manner dependent on the position of the respective associated audio data set in the ranking list.

The image can comprise a two-dimensional or a three-dimensional image. The images can also be arranged three-dimensionally by the rating device. The image has in an extension direction a dimension or length which represents the position of the respective associated audio data set in the ranking list. In this regard, e.g. a bar chart can be produced.

In one preferred embodiment of the method an operating action on the part of the user, e.g. tapping an image on e.g. a touch-sensitive screen, can generate a selection signal that is transmitted to the rating device. The rating device generates a signal for outputting the selected audio data set upon receiving the selection signal. Alternatively, upon receiving the selection signal the rating device can alter the arrangement of the images such that e.g. the selected image is highlighted. By such an operating action, the graphic can also be e.g. zoomed in or out or displaced on the display area. This enables rapid "rummaging" in an audio data set collection.

The inventor also proposes a rating device designed to carry out one of the above-described embodiments of the proposed method. In this case, the rating device is preferably integrated into the music output device, such as e.g. as a microcontroller of the music output device or as a computer program.

The inventor furthermore proposes a motor vehicle, in particular an automobile, which comprises the proposed rating device.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a schematic diagram concerning the principle of one embodiment of the proposed method, FIG. 2A and FIG. 2B in each case show an example of an excerpt from a graphic which may have been created in each case in accordance with one embodiment of the proposed method.

DETAILED DESCRIPTION OF THE PREFERRED EMBODIMENT

Figure 2A:
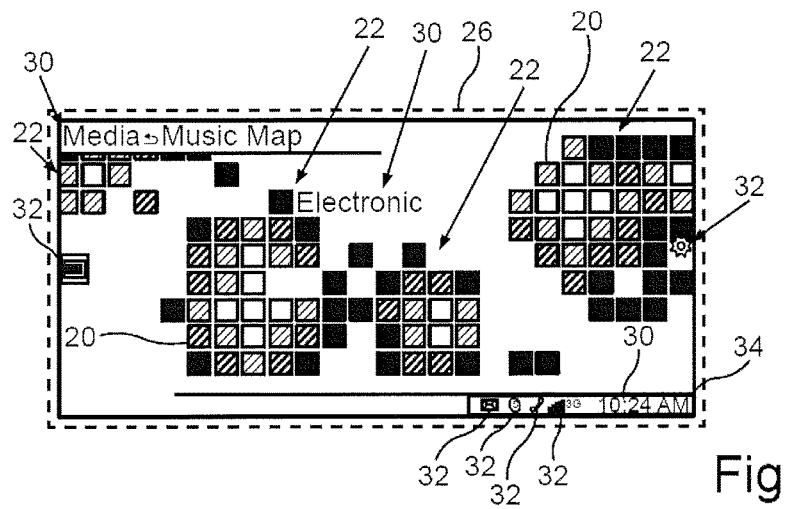

Reference will now be made in detail to the preferred embodiments of the present invention, examples of which are illustrated in the accompanying drawings, wherein like reference numerals refer to like elements throughout.

In one exemplary embodiment, the principle underlying the proposed method is illustrated with reference to FIG. 1.

In the present example, the music output device 10 is e.g. a component of an infotainment system, which component is designed for outputting audio data sets, that is to say for playing back music. Said music output device 10 comprises the rating device 12, for example a microcontroller of the music output device 10 or software which is stored in the infotainment system and which is designed to carry out an embodiment of the proposed method. The music output device 10 can furthermore comprise e.g. a storage device 28, in which audio data sets can be stored, and a display device 24, e.g. a screen of the infotainment system or of some other device, on which an overview generated by the method can be displayed as a graphic 26. Particularly the storage device 28 and/or the rating device 12 can also be wholly or partly integrated in a data server external to the motor vehicle, while the music output device 10 comprises a music output unit of a motor vehicle. The storage device 28 can e.g. also comprise a memory of a local infotainment system, a USB stick or an SD card.

First, in S10, the rating device 12 classifies the audio data sets acquired in the music output device 10 in each case in a plurality of audio data set groups 14 in accordance with a selection criterion ("SEL CRIT"). In order to enable such a classification, the rating device 12 can e.g. generate a signal for requesting the audio data sets and transmit it to the storage device 28 (S5). The storage device 28 can then transmit e.g. a list of the stored audio data sets to the rating device 12. The selection criterion is either predefined by the rating device 12, for example, or can be selected (S80) by a user by initiating a selection signal, e.g. by operating a menu by a touch-sensitive operator interface (e.g. touch screen or touch pad), a mouse or a rotary/pushbutton controller, in particular by touch pad integrated into a rotary/pushbutton controller.

In the present example, the selection criterion shall be the music genre, for example, with respect to which in FIG. 1 the acquired audio data sets are classified into three different groups 14, e.g. "folk music" ("#1"), "rock music" ("#2") and "film music" ("#3"). Alternatively, e.g. a grouping can be carried out in accordance with a mood conveyed by the music (e.g. "relaxation" or "somber music").

In S20 (illustrated in FIG. 1 only on the basis of the audio data set group 14 "#2"), the audio data sets within each group 14 are rated. For this purpose, the rating device 12 determines with respect to each audio data set a value 16 ("x") in accordance with a rating variable ("REF"). Said rating variable indicates a relevance of the audio data set to the user, that is to say a subjective relevance, within the respective group 14. The relevance of the audio data set to the user is expressed e.g. in the frequency of the playback of an audio data set by the music output device 10. Another possible rating variable is e.g. the number of processes of transmission of the audio data set from e.g. a vehicle-external media server to the music output device 10, the number of processes of storage or buffer-storage of the audio data set, and/or the number of those acquired audio data sets which are by e.g. an identical interpreter. In this case, the number of processes can be counted e.g. by a counter e.g. of the rating device 12 or elsewhere in the music output device 10 and can be stored e.g. in a file which supplements the audio data set and which is then read e.g. by the rating device 12. The rating variable can also comprise a digitally acquired user rating of the audio data set, as already described above. Such information, like e.g. the information concerning an interpreter as well, can be present in a file supplementing the audio data set or in the audio data set.

In this case, provision can be made for the rating variable taken as a basis to be selected or set by the user (S80). In this case, the selection can be carried out as already described above for the selection of the selection criterion.

Afterward, in S30, the rating device 12 determines a ranking list 18 within each audio data set group 14 on the basis of the respective value 16 of the individual audio data set. In the example in FIG. 1, e.g. four audio data sets are classified in the audio data set group 14 "rock music" ("#2"). A first audio data set was played back e.g. particularly often, e.g. ten times within the last month, and therefore has the highest ranking ("1st") on the ranking list 18 of the group "#2". Two further audio data sets were played back e.g. eight times in the same period of time and both have a middle ranking ("$2^{nd}$"), while a further audio data set was played back very rarely and therefore occupies the last ranking on the ranking list 18 ("$3^{rd}$").

The rating device 12 generates with respect to each audio data set a digital image 20 representing the respective audio data set (S40). This can be e.g. an image of an album cover associated with the audio data set, but also a field, in particular a square field, having e.g. a specific color or brightness. In the example, the following digital images 20 are associated with the audio data sets: A, B, C and D. These images 20 are classified into an image group 22, wherein in each case those images 20 whose associated audio data sets are combined in the same audio data set group 14 are combined in an image group 22 (S50). In the example, the images 20 are combined as image group "#2" and are transmitted to the display device 24 (S60). The positions of the images 20 within an image group 22 are likewise determined by the rating device 12, to be precise in a manner dependent on the position of the respective associated audio data set in the ranking list 18. Accordingly, the images 20 are arranged on the display area of the display device 24 within the image group 22, such that the arrangement of the images represents the ranking list of the audio data sets.

In the present example, a graphic 26 arises which shows for example the image group 22 "#2" in FIG. 1. In this example, the images 20 B, D and C are arranged around the image A of the most played audio data set, wherein the images 20 of the audio data sets of the ranking "$2^{nd}$" bear directly against the image 20 A, and the image C, corresponding to the lower ranking "$3^{rd}$", is even further away from the image 20 A. In this example, therefore, the distance of the images 20 B, D and C from the image 20 A is dependent on the position of the respective audio data set in the ranking list 18. The other image groups 22 can also be generated and arranged on the display area in this way.

Figure 2B:
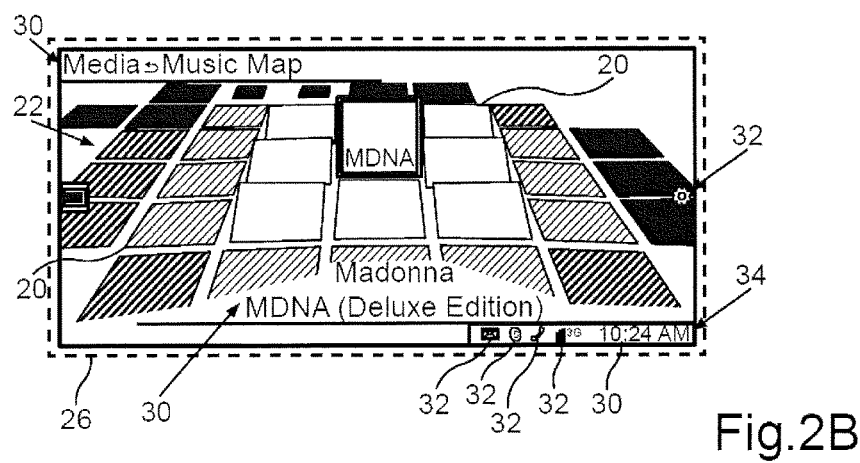

FIG. 2A and FIG. 2B in each case show one example of an excerpt from a graphic 26 which may have been created in each case in accordance with one embodiment of the method according and as already described with regard to FIG. 1.

The image groups 22 composed of digital individual images 20, each of which can represent a music file or a music file group, are shown on the graphic 26 in FIG. 2A. In the present example, the fields of the images 20 of particularly preferred audio data sets have a brighter area than those of less preferred audio data sets. The image groups 22 are at a greater distance from one another than the distance between the adjacent image or images 20 within an image group 22. This gives rise to a graphic 26 on which the image group 22 form clear accumulations. Moreover, such a graphic 26 has an analogy—which is clear to the user—to e.g. a navigation map on which the image groups 22 form e.g. "continents" or "promontories" and are separated e.g. by "oceans". In the center of the graphic 26, two image groups 22 can be seen, for example, which are connected by two individual images 20, for example.

FIG. 2B shows the images 20, here e.g. digital images 20 of a respective album cover or square field, of a zoomed image group 20. Only some of the images 20 are identified by reference signs in FIG. 2B (and likewise in FIG. 2A). The arrangement of the images 20 is three-dimensional, such that those images 20 in the center of the image group 22 whose associated audio data sets are particularly preferred, for example, appear to be tilted obliquely upward. Alternatively, in the course of a navigation through the images 20 or a selection of an image 20, the images 20 or the image 20 over which e.g. a mouse pointer moves or which the user selects appear(s) to be tilted obliquely upward.

On the graphic 26 in both FIGS. 2A and 2B, additional symbols 32 can be seen, comprising e.g. buttons for additional functions of e.g. the rating device 12 or the music output device 10, e.g. a gearwheel symbol 32 for a menu of the settings of the music output device 10, for example, or a plurality of symbols 32 arranged in a symbol strip 34. Text fields 30 can likewise be seen, which display e.g. a caption ("Medial Music Map"), information concerning an audio data set group ("Electronic") or concerning an audio data set ("Madonna", "MDNA (Delux Edition)") or e.g. a time of day ("10:24 AM").

The examples illustrate the concept of representing music in an e.g. two- or in particular three-dimensional music map e.g. analogously to a navigation map. In this case, the arrangement of the music map is based on user-relevant criteria. By way of example, different genres can be different "continents" between which lie regions ("oceans") that separate the genres from one another.

By way of example, interpreters are grouped by the images of an in particular square, basic area. A plurality of interpreters e.g. in the same genre are arranged alongside one another, for example, and so e.g. the continent of the genre arises therefrom.

By way of example, the number of albums or titles with respect to an interpreter produces the height, and so a three-dimensional structure arises in the case of a plurality of interpreters alongside one another. As distance relation, it is possible, alternatively or supplementarily, to use the algorithms which are known from e.g. "genius" and which determine similarity of music. The music search is facilitated as a result.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for operating an infotainment system of a motor vehicle to provide an overview of a plurality of digital audio records, comprising:
    classifying, by a microcontroller, the digital audio records into a plurality of digital audio groups in accordance with a selection criterion;
    determining, by the microcontroller, a value of a rating variable with respect to each digital audio record and rating the digital audio record with the rating variable, the rating variable indicating a relevance of the digital audio record to a user of the infotainment system;
    within each digital audio group determining, by the microcontroller, a ranking list of the digital audio records classified in the digital audio group, the ranking list being determined based on values of the rating variable;
    for each digital audio record, generating, by the microcontroller, a digital image representing the digital audio record;
    classifying, by the microcontroller, each image into an image group in a manner corresponding to how the digital audio records are classified into the digital audio groups;
    displaying, on a display area of a screen of a display device of the infotainment system, the images which are arranged, by the microcontroller, as spaced-apart image groups;
    within each image group, positioning, by the microcontroller, the images on the display area in a manner corresponding to how the associated digital audio records are ranked in the ranking list, the images being positioned such that adjacent images within each image group are positioned more closely with respect to one another than adjacent image groups are positioned with respect to one another, the image groups being arranged analogously to continents or promontories in a navigation map on the display area; and
    in response to receiving an input navigating to images from a first image group among the image groups, displaying images in a center of the first image group in a three-dimensional manner so that the images in the center of the first image group appear tilted obliquely upward relative to other images in the first image group,
    wherein displaying images from the first image group includes displaying outer images from the first image group to appear to have an angle of tilt that is less than an angle of tilt of inner images from the first image group, the outer images being further from the center of the first image group than the inner images, and digital audio records corresponding to the outer images have a lower ranking than digital audio records corresponding to the inner images.

2. The method as claimed in claim 1, wherein the selection criterion used to classify the digital audio records into digital audio groups is at least one of recording artist, music author, music genre, year of publication and an association of the digital audio record with an album.

3. The method as claimed in claim 1, wherein the value of the rating variable is determined based on at least one of how often the digital audio record has been output by a music output device, how often the digital audio record has been stored or cached by the music output device, how often the digital audio record has been downloaded from a vehicle-external data server, and how many digital audio records of the same recording artist have been acquired by the music output device.

4. The method as claimed in claim 1, wherein determining the value of the rating variable comprises a receiving a rating of the digital audio record from the user of the infotainment system.

5. The method as claimed in claim 1, wherein
    there are a plurality of potential selection criteria used to classify the digital audio records into digital audio groups,
    the value of the rating variable is determined by a rating device, and
    the rating device receives a selection signal for selecting a user-preferred selection criterion from the plurality of potential selection criteria.

6. The method as claimed in claim 5, wherein the plurality of potential selection criteria include at least one criterion selected from the group consisting of recording artist, music author, music genre, year of publication and an association of the digital audio record with an album.

7. The method as claimed in claim 1, wherein
    the value of the rating variable is determined by a rating device, and
    an operating action by the user of the infotainment system generates a selection signal for selecting a selected image, and
    the rating device generates a signal for outputting the digital audio record represented by the selected image upon receiving the selection signal.

8. The method as claimed in claim 1, wherein each image is generated using an image of an album cover for the digital audio record or an image of a recording artist of the digital audio record.

9. The method as claimed in claim 1, wherein
    the images are generated based on the ranking list, and
    within the ranking list, images representing digital audio records having a higher ranking are offset from images representing digital audio records having a lower ranking by a marking difference, a color difference or a brightness difference.

10. The method as claimed in claim 1, further comprising:
    positioning a first image in the first image group in a center of the display area of the display device, the first image corresponding to a highest ranked digital audio record in the ranking list for a first digital audio group corresponding to the first image group; and
    positioning in the display area of the display device, remaining images in the first image group at distances from the first image corresponding to how digital audio records corresponding to the remaining images are ranked in the ranking list for the first digital audio group, the remaining images being arranged helically around the first image.

11. The method as claimed in claim 1, further comprising:
    positioning a first image in the first image group in a center of the display area of the display device, the first image corresponding to a highest ranked digital audio record in the ranking list for a first digital audio group corresponding to the first image group;
    displaying the first image to appear tilted obliquely upward at a first angle relative to a plane of the display area;
    displaying a second image among the images from the first image group to appear tilted obliquely upward at a second angle relative to the plane, the second angle being less than the first angle; and displaying a third image among the images from the first image group to appear tilted obliquely upward at a third angle relative to the plane, the third angle being less than the second angle, the third image being positioned at a distance further away from the first image than a distance the second image is positioned away from the first image, the third image corresponding to a third digital audio record ranked lower in the ranking list for the first digital audio group than a second digital audio record corresponding to the second image.

12. The method as claimed in claim 1, wherein
in the display area of the display device, a base position is assigned to a first image in the first image group,
the first image represents a highest ranked digital audio record in the ranking list, and
in the display area of the display device, images in the first image group, which represent lower ranked digital audio records are positioned at distances from the first image corresponding to how the digital audio records are ranked in the ranking list.

13. The method as claimed in claim 12, wherein
the first image is positioned in a center of the display area of the display device, and
the images in the first image group, which represent lower ranked digital audio records are arranged helically around the first image.

14. The method as claimed in claim 1, wherein the images are sized to show how the digital audio records represented thereby are ranked in the ranking list.

15. The method as claimed in claim 1, wherein
a rating device arranges the images in the display area of the display device, and
the rating device arranges the images within at least one three-dimensional group.

16. The method as claimed in claim 1, wherein each digital audio record is acquired by a music output device by at least one of being stored in a memory of the motor vehicle, being cached during a previous audio output and being downloaded from an external data server.

17. The method as claimed in claim 1, further comprising:
positioning a first image in the first image group in a center of the display area of the display device, the first image corresponding to a highest ranked digital audio record in the ranking list for a first digital audio group corresponding to the first image group;
positioning in the display area of the display device, remaining images from the first image group at distances from the first image corresponding to how digital audio records corresponding to the remaining images are ranked in the ranking list for the first digital audio group, the remaining images being arranged helically around the first image;
displaying the first image to appear tilted obliquely upward at a first angle relative to a plane of the display area;
displaying a second image among the images from the first image group to appear tilted obliquely upward at a second angle relative to the plane, the second angle being less than the first angle; and displaying a third image among the images from the first image group to appear tilted obliquely upward at a third angle relative to the plane, the third angle being less than the second angle, the third image being positioned at a distance further away from the first image than a distance the second image is positioned away from the first image, the third image corresponding to a third digital audio record ranked lower in the ranking list for the first digital audio group than a second digital audio record corresponding to the second image.

18. A rating device of an infotainment system of a motor vehicle, the rating device comprising a processor to:
classify digital audio records into a plurality of digital audio groups in accordance with a selection criterion;
determine a value of a rating variable with respect to each digital audio record and rate the digital audio record with the rating variable, the rating variable indicating a relevance of the digital audio record to a user of the infotainment system;
determine, within each digital audio group, a ranking list of the digital audio records classified in the digital audio group, the ranking list being determined based on values of the rating variable;
generate for each digital audio record, a digital image representing the digital audio record;
classify each image into an image group in a manner corresponding to how the digital audio records are classified into the digital audio groups;
arranging the images for display on a display area of a screen of a display device of the infotainment system as spaced-apart image groups;
position the images within each image group, on the display area in a manner corresponding to how the associated digital audio records are ranked in the ranking list, the images being positioned such that adjacent images within each image group are positioned more closely with respect to one another than adjacent image groups are positioned with respect to one another, the image groups being arranged analogously to continents or promontories in a navigation map on the display area; and
in response to receiving an input navigating to images from a first image group among the image groups, display images in a center of the first image group in a three-dimensional manner so that the images in the center of the first image group appear tilted obliquely upward relative to other images in the first image group,
wherein images from the first image group are displayed by displaying outer images from the first image group to appear to have an angle of tilt that is less than an angle of tilt of inner images from the first image group, the outer images being further from the center of the first image group than the inner images, and digital audio records corresponding to the outer images have a lower ranking than digital audio records corresponding to the inner images.

19. The rating device as claimed in claim 18, wherein the rating device is integrated into a music output device.

20. A motor vehicle, comprising the rating device as claimed in claim 18.

* * * * *